United States Patent
Amler

(10) Patent No.: US 10,875,405 B2
(45) Date of Patent: Dec. 29, 2020

(54) DEVICE AND METHOD FOR CONTROLLING A DRIVE APPARATUS FOR TRACTION OF A VEHICLE

(71) Applicant: SIEMENS MOBILITY GMBH, Munich (DE)

(72) Inventor: Gerald Amler, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/620,105

(22) PCT Filed: May 30, 2018

(86) PCT No.: PCT/EP2018/064133
§ 371 (c)(1),
(2) Date: Dec. 6, 2019

(87) PCT Pub. No.: WO2019/001881
PCT Pub. Date: Jan. 3, 2019

(65) Prior Publication Data
US 2020/0198474 A1    Jun. 25, 2020

(30) Foreign Application Priority Data
Jun. 30, 2017   (DE) .................. 10 2017 211 193

(51) Int. Cl.
*G05D 1/02* (2020.01)
*B60L 15/20* (2006.01)
(Continued)

(52) U.S. Cl.
CPC ............. *B60L 7/06* (2013.01); *B60L 15/2009* (2013.01); *B60L 7/14* (2013.01); *B60L 7/18* (2013.01);
(Continued)

(58) Field of Classification Search
CPC ...... B60L 7/06; B60L 7/14; B60L 7/18; B60L 7/26; B60L 15/2009; B60L 2200/26; B60L 2240/12; B61L 15/0072
See application file for complete search history.

(56) References Cited

U.S. PATENT DOCUMENTS

2018/0072160 A1*  3/2018  Cai ........................... B60L 9/00

FOREIGN PATENT DOCUMENTS

DE           19933789 A1    2/2001
DE        102015203303 A1    8/2016
(Continued)

*Primary Examiner* — Anne Marie Antonucci
*Assistant Examiner* — Sahar Motazedi
(74) *Attorney, Agent, or Firm* — Laurence Greenberg; Werner Stemer; Ralph Locher

(57) ABSTRACT

A device which is configured for controlling a vehicle drive (40) for traction of a vehicle has a drive control apparatus and a monitoring apparatus. In order to ensure a high degree of safety when using the vehicle drive during rapid deceleration of the vehicle, the monitoring apparatus provides a traction release control signal value to the drive control apparatus, under the effect of which the drive control apparatus is enabled to control the vehicle drive, if, in addition to a traction release request signal value due to a rapid deceleration request and an additional traction lock request signal value due to a traction lock request, an additional traction release request signal value due to a traction release condition has effect on the monitoring apparatus. There is also described a vehicle with such a device and to a method for controlling a vehicle drive for traction of a vehicle.

16 Claims, 2 Drawing Sheets

(51) Int. Cl.
*B60L 7/06* (2006.01)
*B60L 7/14* (2006.01)
*B60L 7/18* (2006.01)
*B60L 7/26* (2006.01)
*B61L 15/00* (2006.01)

(52) U.S. Cl.
CPC ............. *B60L 7/26* (2013.01); *B60L 2200/26* (2013.01); *B60L 2240/12* (2013.01); *B61L 15/0072* (2013.01)

(56) References Cited

FOREIGN PATENT DOCUMENTS

| | | |
|---|---|---|
| EP | 2133254 A2 | 12/2009 |
| EP | 2559602 B1 | 10/2015 |
| WO | WO 2016134964 A1 | 9/2016 |

* cited by examiner

DEVICE AND METHOD FOR CONTROLLING A DRIVE APPARATUS FOR TRACTION OF A VEHICLE

BACKGROUND OF THE INVENTION

Field of the Invention

The invention relates to a device which is designed to be suitable for controlling a drive apparatus for traction of a vehicle.

It is known that in the case of a vehicle, in particular a rail vehicle, in which electric drive apparatuses form an electric drive system which, with corresponding actuation in a braking mode, deploys a braking effect on the vehicle, a friction brake system for braking the vehicle is conventionally provided in addition. In this case, the electric drive system is used operationally as part of what is known as a service brake of the vehicle—in other words, during a service braking operation—for braking the vehicle. However, the electric drive system is not normally used as part of what is known as an emergency brake—in other words, not during emergency braking—in order to brake the vehicle in dangerous situations, since a higher safety level is ascribed to the friction brake system than the electric drive system with regard to the respective braking effect.

It is also known that, when a vehicle, in particular a rail vehicle, is stopped, it is necessary that it does not begin to move unintentionally and thereby possibly put passengers in danger who are currently in the region of an entrance. Such a requirement is conventionally achieved by means of what is known as a "traction lock".

Thus, for example, a device is known from the publication EP 2 559 602 B1 in which, due to a traction lock request, the output of the actuation signals, generated by a drive control apparatus, to a drive apparatus is blocked; therefore, the drive control apparatus is blocked for actuation of the drive apparatus due to a traction lock request.

From publication WO 2016/134964 A1 a vehicle is known, having a drive apparatus with one or more electric motor(s) and a drive control apparatus which is connected to the drive apparatus and controls said drive apparatus. In this known vehicle, the drive apparatus, which is referred to there as a "drive", is separated from an energy supply network of the vehicle if a drive current measurement value indicates an active drive operation of the drive apparatus and at the same time an emergency braking signal indicates emergency braking. For this purpose, in addition to the drive control apparatus, the vehicle has an electrical switch and a monitoring apparatus which acts on the electrical switch by means of a control signal. In the closed state the electrical switch connects the drive apparatus to an energy supply connection of the energy supply network. In the open state the electrical switch disconnects the drive apparatus from the energy supply connection. The monitoring apparatus operates independently of the drive control apparatus. By opening the switch, switch-off of the drive apparatus is forced independently of whether or not the drive control apparatus wants to actively operate the drive apparatus.

The invention is based on a device which is designed to be suitable for controlling a drive apparatus for traction of a vehicle and which has a drive control apparatus and a monitoring apparatus (WO 2016/134964 A1).

SUMMARY OF THE INVENTION

The invention is based on the object of designing the device for use of the drive apparatus in the case of emergency braking operations of the vehicle—in other words, using the drive apparatus as part of the vehicle's emergency brake—in such a way that a high degree of safety is ensured in another way.

This object is inventively achieved by a device having the features as claimed. Advantageous embodiments of the inventive device are specified in the dependent claims.

It is accordingly inventively provided that the monitoring apparatus is designed to be suitable for providing the drive control apparatus with a traction release control signal value, under the effect of which the drive control apparatus is released for actuation of the drive apparatus if, in addition to a traction release request signal value due to an emergency braking request and an additional traction lock request signal value due to a traction lock request, an additional traction release request signal value due to a traction release condition also acts on the monitoring apparatus.

An essential advantage of the inventive device is that, when it is used to control a drive apparatus, a secure proportion of the drive apparatus is ensured at the emergency brake of the vehicle. This is because the inventive device ensures that even if the traction lock request is present, actuation of the drive apparatus by the drive control apparatus for emergency braking is released if this is required due to the emergency braking request and is permissible due to the traction release condition.

It is regarded as advantageous if the monitoring apparatus is designed to be suitable for providing the drive control apparatus with a traction lock control signal value, instead of the traction release control signal value, under the effect of which the drive control apparatus is locked for actuation of the drive apparatus if, in addition to the traction release request signal value due to the emergency braking request and the additional traction lock request signal value due to the traction lock request, an additional traction lock request signal value due to a traction lock condition acts on the monitoring apparatus instead of the additional traction release request signal value.

As a result, untimely driving of the vehicle by the drive apparatus, for example at the instant of a stop at a railway platform, at which persons could be endangered by an unintentional vehicle movement, can be avoided. Thus, it is ensured that even if the emergency braking request is present, actuation of the drive apparatus is blocked by the drive control apparatus if this is necessary due to the traction lock request and the traction lock condition.

It is also considered to be advantageous if the monitoring apparatus is designed to be suitable for providing the traction release request signal value as the traction release control signal value.

Preferably, the drive control apparatus itself is designed to be suitable for providing the monitoring apparatus with the traction release request signal value under the effect of an emergency braking signal value, which is present at the drive control apparatus due to the emergency braking request. This has the advantage that no additional components are necessary for providing the traction release control signal value.

According to an advantageous embodiment of the inventive device it is provided that the drive control apparatus is designed to be suitable for providing the monitoring apparatus with a traction lock request signal value due to a traction lock test request, instead of the traction release request signal value, if the emergency braking signal value is not present. This has the advantage that it is possible to easily test whether the drive control apparatus can be reliably locked for actuation of the drive apparatus.

In order to meet particularly high safety requirements it is advantageous if the monitoring apparatus is designed as a hardware apparatus, in particular in the form of an electrical circuit.

In a preferred embodiment, the monitoring apparatus has a control signal path, at which the traction release request signal value is present due to the emergency braking request and in the course of which a switching apparatus is arranged, which has two switching units connected in parallel, wherein the control signal path is released by the switching apparatus for signal transmission if, on the one hand, the one switching unit is kept open under the effect of the additional traction lock request signal value due to the traction lock request and, on the other hand, the other switching unit is kept closed under the effect of the additional traction release request signal value due to the traction release condition.

Furthermore, it is advantageously provided that the control signal path is locked by the switching apparatus for signal transmission if, on the one hand, the one switching unit is kept open under the effect of the additional traction lock request signal value due to the traction lock request and, on the other hand, the other switch unit is kept open under the effect of the additional traction lock request signal value due to the traction lock condition.

It is also considered advantageous if the drive control apparatus has a control unit, an output unit which forms a control output, and an actuation control unit which forms a control input,
  wherein the control unit is designed to be suitable for outputting a drive control command to the actuation control unit, which the actuation control unit converts into a drive control signal,
  wherein the control unit is designed to be suitable for outputting, under the effect of an emergency braking signal value, which is present at the control unit due to the emergency braking request, a request for traction release to the output unit, which request the output unit converts into the traction release request signal value and outputs it at its control output, and
  wherein the actuation control unit is designed to be suitable for releasing the output of the drive control signal if the traction release control signal value is present at its control input, and to lock the output of the drive control signal if the traction lock control signal value is present at its control input instead of the traction release control signal value.

The invention also relates to a vehicle, in particular a rail vehicle, having at least one drive apparatus for traction of the vehicle, wherein the vehicle has an inventive device for controlling the at least one drive apparatus.

It is considered advantageous if the vehicle has a hardwired safety loop which is designed to be suitable for providing the monitoring apparatus with the additional traction lock request signal value if it is interrupted due to the traction lock request, and, instead of the additional traction lock request signal value, for providing an additional traction release request signal value if it is closed.

In addition, it is considered advantageous if the vehicle has a speed detection apparatus which is designed to be suitable for providing the additional traction release request signal value if at least one detected speed value or a speed value of the vehicle derived from at least one of the detected speed values is greater than a predefined minimum speed value, and, instead of the additional traction release request signal value, for providing the additional traction lock request signal value if each of the detected speed values or the derived speed value of the vehicle is less than or equal to the predefined minimum speed value.

Furthermore, it is considered advantageous if the vehicle has a sensor device, wherein the sensor device or the speed detection apparatus is designed to be suitable for forming the at least one speed value on the basis of measurement signals which are detected by the sensor device on a bogie provided with the drive apparatus.

The invention also relates to a method for controlling a drive apparatus for traction of a vehicle.

According to the invention, with respect to such a method, it is provided that a monitoring apparatus provides a drive control apparatus with a traction release control signal value, under the effect of which the drive control apparatus is released for controlling the drive apparatus if, in addition to a traction release request signal value due to an emergency braking request and an additional traction lock request signal value due to a traction lock request, an additional traction release request signal value due to a traction release condition also acts on the monitoring apparatus.

With regard to the advantages of the inventive method, reference is made to the above statements in connection with the inventive device since the advantages of the inventive method substantially correspond to those of the inventive device.

Analogously to the inventive device, it is regarded as advantageous in the inventive method if the monitoring apparatus provides the drive control apparatus with a traction lock control signal value, instead of the traction release control signal value, under the effect of which the drive control apparatus is locked for actuation of the drive apparatus if, in addition to the traction release request signal value due to the emergency braking request and the additional traction lock request signal value due to the traction lock request, an additional traction lock request signal value due to a traction locking condition acts on the monitoring apparatus instead of the additional traction release request signal value.

BRIEF DESCRIPTION OF THE SEVERAL VIEWS OF THE DRAWING

The invention will be explained in more detail below on the basis of an exemplary embodiment. In the drawings.

DESCRIPTION OF THE INVENTION

Figure 1:
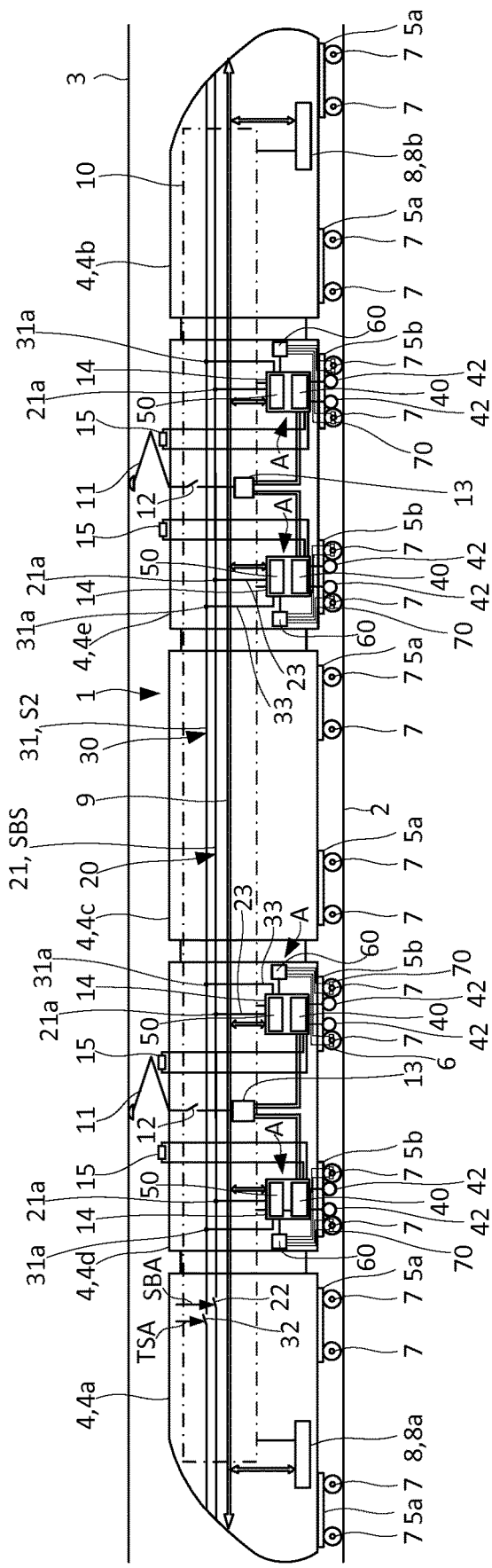
FIG. 1 shows an inventive vehicle in the form of a rail vehicle with drive apparatuses for traction of the vehicle, in which an inventive device for control is assigned to each of the drive apparatuses.

FIG. 1 shows an inventive vehicle 1 in the form of a rail vehicle on a track 2 which is provided with an overhead line 3 of a railway network supply.

The rail vehicle has, for example, a plurality of carriages 4, of which two form end carriages 4a, 4b and three form central carriages 4c, 4d, 4e.

The rail vehicle also has a central train control apparatus 8 with two redundant train control apparatuses 8a, 8b. In addition, the rail vehicle has a data exchange device 9 and an energy supply device designated as a whole by 10. The data exchange device 9 extends over all carriages 4 and can be designed, for example, as a train bus or Ethernet. Of the energy supply device 10, FIG. 1 shows in detail, in particular, current collectors 11, main power switches 12, transformers 13, power converter containers 14 and braking resistors 15.

The rail vehicle 1 also has an apparatus, designated as a whole by 20, for requesting emergency braking and a further apparatus, designated as a whole by 30, for requesting a traction lock.

Due to the safety requirements for emergency braking and the traction lock, emergency braking requests and traction lock requests are activated in each case by means of a plurality of sources and are preferably converted into corresponding request signal values for wired and multi-channel transmission.

Of the two devices 20 and 30, the figures show a hard-wired safety loop 21 and 31 respectively.

Arranged in the course of the hard-wired safety loop 21 is at least one contact 22, which is opened under the effect of an emergency braking request SBA. Electrical control lines 23 routed to the power converter containers 14 branch off at connection points 21a of the hard-wired safety loop 21, only some of which respectively are designated here for the sake of clarity.

Arranged in the course of the further hard-wired safety loop 31 is at least one further contact 32, which is opened under the effect of a traction lock request TSA. Further electrical control lines 33 routed to the power converter containers 14 branch off at connection points 31a of the hard-wired safety loop 31, only some of which respectively are likewise identified here for the sake of clarity.

The hard-wired safety loop 21 is used to provide an emergency brake signal SBS in the form of an electrical voltage whose value indicates whether or not an emergency braking request SBA is present. If the safety loop 21 connected to a voltage source is open due to an emergency braking request SBA, a 0 volt voltage value, which can be tapped at the connection point 21a, forms an emergency braking signal value SBS.1—in other words, indicates that the emergency braking request is present. If the safety loop 21 is closed, a 110V volt voltage value, which can be tapped at the connection point 21a, forms a signal value SBS.2 which indicates that no emergency braking request SBA is present.

The central train control apparatus 8 and the data exchange device 9 can also be part of the device 20 for requesting emergency braking since the central train control apparatus 8 converts an emergency braking request (in other words, an emergency braking command) SBA' into an emergency braking signal value (in other words, into emergency braking information) SBS.1' and can then be provided via the data exchange device 9. In addition, a signal value SBS.2' can be provided, which indicates that no emergency braking request SBA' is present.

As is also shown in the following, both the emergency braking signal value SBS.1 and the emergency braking signal value SBS.1' are converted into a traction release request signal value S1.1 of a request signal S1.

In addition, on the one hand, a traction release test request TFTA and, on the other hand, a traction lock test request TSTA can preferably be activated by means of the central train control apparatus 8 and in particular when neither an emergency braking request nor a traction lock request are activated. In this case, an activated traction release test request TFTA is converted into a traction release test signal value (in other words, traction release test information) TS.1 of a test signal TS, which is then also converted into the traction release request signal value S1.1 via a request for traction release ATF. On the other hand, an activated traction lock test request TSTA is converted into a traction lock test signal value (in other words, traction lock test information) TS.2 of the test signal TS. The traction lock test signal value TS.2 is then converted into a traction lock request signal value S1.2 of the request signal S1 via a request for the traction lock ATS.

The further hard-wired safety loop 31 is used to provide a further request signal S2 in the form of an electrical voltage, the value of which indicates whether or not a traction lock request TSA is present. If the safety loop 31 connected to a voltage source is open due to a traction lock request TSA, a 0 volt voltage value, which can be tapped at the connection point 31a, forms a further traction lock request signal value S2.2, in other words, indicates that a traction lock request TSA ("traction lock" for short) is present. If the safety loop 31 is closed, a 110 volt voltage value, which can be tapped at the connection point 31a, indicates that the traction lock request TSA is not present and instead a pulse inverter release request ("PWR RELEASE" for short) is then present inversely to the traction lock request TSA.

In addition, it is also shown that an additional request signal S3 in the form of an electrical voltage is provided whose value indicates whether a traction release condition TFB or a traction lock condition TSB is present. If a traction release condition TFB is present, a 110 volt voltage value forms an additional traction release request signal value S3.1. If the traction lock condition TSB is present, a 0 volt voltage value forms an additional traction lock request signal value S3.2.

The two end carriages 4a, 4b and the central carriage designated 4c are drive-free carriages. The carriages each have two bogies 5a in the form of what are known as running bogies without drive apparatuses. The two central carriages designated 4d and 4e are drive carriages which, in practice, are also referred to as power cars. The drive carriages 4d, 4e each have two bogies 5b in the form of what is known as motor bogies.

Each of the motor bogies is assigned in each case one drive apparatus 40 which has a power converter unit 41 (see FIG. 2) and two traction motors 42.

In addition to the device 50, which serves to control the drive apparatus 40 of the respective bogie 5b, a speed detection apparatus 60 and a sensor device 70 are also assigned to the respective bogie 5b, so in each case one of the devices 50 together with one of the speed detection apparatuses 60 and one of the sensor devices 70 form an arrangement A assigned to the respective bogie 5b, and therefore not a central but rather a local arrangement A.

Each of the traction motors 42 is used in engine operation for driving or in generator mode for braking in each case one of the wheel axles 7 of the respective motor bogie 5b provided with wheels 6 on the end side.

As an alternative to this, for example, a separate drive apparatus with only one traction motor could be provided for each wheel axle of a motor bogie.

Figure 2:
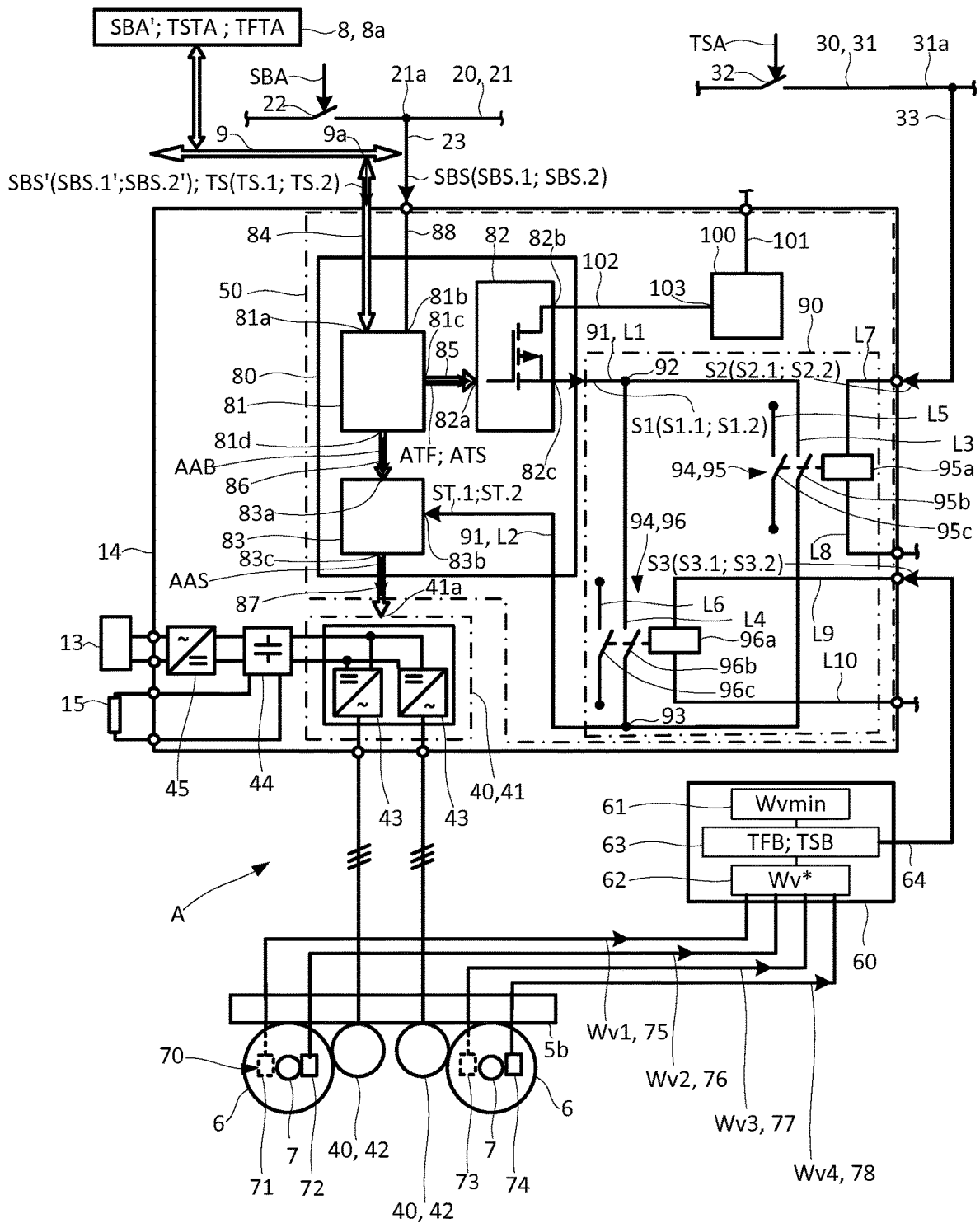
FIG. 2 shows one of the drive apparatuses from FIG. 1 with the inventive device for control assigned to it.

Of the drive apparatus 40, FIG. 2 shows, in addition to the traction motors 42, the power converter unit 41, which is accommodated in the power converter container 14.

The power converter unit 41 has two traction inverters 43 in the form of pulse inverters. The traction inverters 43 are connected in parallel via a direct current link 44 and a mains inverter 45 to one of the transformers 13. In addition, at least one of the braking resistors 15 is connected to the direct current link 44, in particular via a brake chopper (not shown here).

During engine operation, each of the two traction inverters 43 converts a direct current from the DC link 45 into an alternating current, by means of which the traction motor 42, which is connected to the respective traction inverter 43, is supplied. During an electric braking operation, the traction motors 42 are operated as generators, wherein during generator mode electrical energy is diverted to the braking resistor 15 via the traction inverter 43. As an alternative to this, a configuration could also be provided by means of which the electrical energy in the generator mode is fed by means of the traction inverter 43 back into the railway network supply.

In addition, FIG. 2 shows a section of the hard-wired safety loop 21, a section of the further hard-wired safety loop 31 and a section of the data exchange device 9 with the train control apparatus 8a.

Furthermore, FIG. 2 shows the device 50 accommodated in the power inverter 14 as well as the speed detection apparatus 60 and the sensor device 70.

The device 50, which is designed to be suitable for controlling the associated drive apparatus 40, also has, in addition to a drive control apparatus 80 designed as a drive control apparatus (ASG), a monitoring apparatus 90.

The power converter container 14 has an internal voltage supply device 100 which is connected via a line 101 to a voltage pole (not shown here) of the energy supply device 10 of the rail vehicle 1. For example, +110 v are provided at the voltage pole of the energy supply device 10.

Of the speed detection apparatus 60, a storage unit 61, an evaluation unit 62 and a comparison unit 63 are shown.

A predefined minimum value Wvmin is stored in the storage unit 61. Alternatively, the minimum value Wvmin of the speed detection apparatus 60 can also be predefined by an external device. The evaluation unit 62 is designed to be suitable for deriving a speed value Wv*, for example in the form of a mean of the plurality of speed values Wv1, Wv2, Wv3, Wv4, from a plurality of speed values Wv1, Wv2, Wv3, Wv4. The derived speed value Wv* is compared with the predefined minimum value WVmin in the comparison unit 63.

On the basis of the result of the comparison, the speed detection apparatus 60 forms the additional request signal S3, which then acts on the monitoring apparatus 90 via an additional control line 64.

Of the sensor device 70, four sensors 71 to 74 are shown, each of which determines one of the speed values Wv1, Wv2, Wv3 or Wv4 of the vehicle in the vicinity of a wheel 6 of the bogie 5b on the respective wheel axle 7. The measured speed values Wv1, Wv2, Wv3, Wv4 are transmitted via connecting lines 75, 76, 77, 78 to the evaluation unit 62 of the speed detection apparatus 60.

Of the drive control apparatus 80, a control unit 81, an output unit 82 designed as a hardware output ("HW output" or "HW-Out" for short), and a actuation control unit 83, as well as four signal paths 84 to 87 designed as bus sections and a fifth signal path 88 designed as an electrical line section are shown.

A first input 81a of the control unit 81 is connected to a connection point 9a of the data exchange device 9 by means of a first signal path 84 of the signal paths. In addition, a second input 81b of the control unit 81 is connected by means of the electrical line section 88 to the line section branching off from the connection point 21a.

A first input 82a of the output unit 82 is connected to a first output 81c of the control unit 81 by means of a second signal path 85 of the signal paths. In addition, a second input 82b of the output unit 82 is connected by means of an electrical line 102 to a voltage pole 103 of the internal voltage supply device 100. For example, +110 v are provided at the voltage pole 103.

A first input 83a of the actuation control unit 83 is connected to a second output 81d of the control unit 81 via a third signal path 86 of the signal paths.

A first input 41a of the power converter unit 41 is connected to an output 83c of the actuation control unit 83 via the fourth signal path 87.

The monitoring apparatus 90 is designed as a hardware device in the form of an electrical circuit having line sections L1 to L10.

The monitoring apparatus 90 has an electrical control signal path 91 with the line sections L1 and L2, in the course of which path a switching apparatus 94 is arranged between connection points 92, 93.

The one section L1 of the electrical control signal path 91 connects an output 82c of the output unit 82 to the one connection point 92 and the further section L2 of the electrical control signal path 91 connects a second input 83b of the actuation control unit 83 to the further connection point 92. The output 82c is also referred to hereinafter as a control output of the drive control apparatus 80 and the input 83b is also referred to hereinafter as a control input of the drive control apparatus 80.

The switching apparatus 94 has two switching units 95, 96 connected in parallel. The two switching units 95, 96 each have an actuator 95a or 96a and in each case two switching contacts 95b, 95c or 96b, 96c which can be actuated by the actuator.

A first 95b of the contacts of the one switching unit 95 is arranged in the course of the line section L3 connected to the two connection points 92, 93. A first 96b of the contacts of the other switching unit 96 is arranged in the course of the line section L4 connected to the two connection points 92, 93. The second contact 95c of the one switching unit 95 is arranged in the course of the line section L5, at the ends of which a first signaling signal can be tapped and the second contact 96c of the other switching unit 96 is arranged in the course of the line section L6, at the ends of which a second signaling signal can be tapped.

The actuator designated 95a is connected, on the one hand, via the line section L7 to the further control line 33 branching off from the connection point 31a and, on the other hand, via the line section L8 to a ground pole (not shown here).

The actuator designated 96a is connected, on the one hand, via the line section L9 to the additional control line 64 and, on the other hand, via the line section L10 to a further ground pole (likewise not shown here).

The inventive device operates in the following manner:

Under the effect of the emergency braking signal value SBS.1; SBS.1', which is present at the control unit 81 due to the emergency braking request SBA; SBA', the control unit 81 outputs to the output unit 82 of the drive control apparatus 80 the request for traction release ATF.

The output unit 82 converts the request for traction release ATF into the traction release request signal value S1.1 and outputs the latter at its control output 82c. The drive control apparatus 80 therefore provides the monitoring apparatus 90 with the traction release request signal value S1.1.

The hard-wired safety loop 31 provides the further traction lock request signal value S2.2 when it is interrupted due to the traction lock request TSA. Instead of the additional traction lock request signal value S2.2, the hard-wired safety loop 31 provides a further traction release request signal value S2.1 when it has been closed.

The speed detection apparatus 60 provides the additional traction release request signal value S3.1 if a speed value Wv* of the vehicle 1 derived from the detected speed values Wv1, Wv2, Wv3, Wv4 is greater than a predefined minimum speed value Wvmin. For example, the highest and the lowest of the four detected speed values Wv1, Wv2, Wv3, Wv4 can be ignored and the derived speed value Wv* can be provided as the mean of the two other of the four detected speed values Wv1, Wv2, Wv3, Wv4.

Instead of the additional traction release request signal value S3.1, the speed detection apparatus 60 provides the additional traction lock request signal value S3.2 if the derived speed value Wv* of the vehicle 1 is less than or equal to the predetermined minimum speed value Wvmin.

As an alternative to this, the speed detection apparatus could be designed to provide the additional traction lock request signal value S3.2 if each of the detected speed values Wv1, Wv2, Wv3, Wv4 is less than or equal to the predefined minimum speed value Wvmin.

The sensor device 70 or the speed detection apparatus 60 forms the speed values Wv1; Wv2; Wv3; Wv4 on the basis of measurement signals which are detected by the sensor device 70 on a bogie 5b provided with the drive apparatus 40.

Under the action of a control command (not shown here) of the central train control apparatus 8, the control unit 81 of the drive control apparatus 80 outputs a drive control command AAB to the actuation control unit 83 of the drive control apparatus 80, which the actuation control unit 83 converts into a drive control signal AAS.

The actuation control unit 83 releases the output of the drive control signal AAS when the traction release control signal value ST.1 is present at its control input 83b. The actuation control unit 83 blocks the output of the drive control signal AAS when, instead of the traction release control signal value ST.1, the traction lock control signal value ST.2 is present at its control input 83b.

For this purpose, for example an inverter lock, not shown in detail, acts on the output driver in the actuation control unit 83. If the traction release control signal value ST.1 is present at the control input 83b, the inverter lock releases the output of pulses for actuation of the two traction inverters 43 of the power converter unit 41, which form the drive control signal AAS. If the traction lock control signal value ST.2 is present at the control input 83b, the inverter lock switches off the output of the pulses for actuation of the two traction inverters 43 of the power converter unit 41.

The monitoring apparatus 90 provides the drive control apparatus 80 with the traction release control signal value ST.1, under the effect of which the drive control apparatus 80 is released for actuation of the drive apparatus 40 if, in addition to the traction release request signal value S1.1 due to the emergency braking request SBA and the additional traction lock request signal value S2.2 due to the traction lock request TSA, the additional traction release request signal value S3.1 due to the traction release condition TFB also acts on the monitoring apparatus 90.

For this purpose, the traction release request signal value S1.1 is present at the control signal path 91 of the monitoring apparatus 90 due to the emergency braking request SBA. In this case, the control signal path 91 is released by the switching apparatus 94 for signal transmission if, on the one hand, the one switching unit 95 is kept open under the effect of the additional traction lock request signal value S2.2 due to the traction lock request TSA and, on the other hand, the other switching unit 96 is kept closed under the effect of the additional traction release request signal value S3.1 due to the traction release condition TFB.

The monitoring apparatus 90 therefore provides the traction release request signal value S1.1 as the traction release control signal value ST.1.

The monitoring apparatus 90 provides the drive control apparatus 80 with the traction lock control signal value ST.2, instead of the traction release control signal value ST.1, under the effect of which the drive control apparatus 80 is blocked for actuation of the drive apparatus 40 if, in addition to the traction release request signal value S1.1 due to the emergency braking request SBA and the additional traction lock request signal value S2.2 due to the traction lock request TSA, the additional traction lock request signal value S3.2 due to the traction lock condition TSB acts on the monitoring apparatus 90, instead of the additional traction release request signal value S3.1.

For this purpose, the control signal path 91 is blocked for signal transmission by the switching apparatus 94 if, on the one hand, the one switching unit 95 is kept open under the effect of the additional traction lock request signal value S2.2 due to the traction lock request TSA and, on the other hand, the other switching unit 96 is likewise kept open under the effect of the additional traction lock request signal value S3.2 due to the traction lock condition TSB.

The drive control apparatus 80 can provide the monitoring apparatus 90 with the request signal value S1.1 even in other cases, for example when the vehicle is to be driven.

Furthermore, instead of the traction release request signal value S1.1, the drive control apparatus 80 can provide the monitoring apparatus 90 with the traction lock request signal value S1.2 due to the traction lock test request TSTA if the emergency braking signal value SBS.1; SBS.1' is not present.

According to the invention, a change in terms of hardware from the traction lock request TFA to the emergency braking request SBA, SBA' is therefore performed by the traction release condition "Wv*>Wvmin". On the other hand, a change in terms of hardware from the emergency braking request SBA, SBA' to the traction lock request TFA is performed by the traction lock condition "Wv*Wvmin", wherein this change occurs in particular if the vehicle 1 is almost at a standstill (Wvmin>0) or alternatively at a standstill (WVmin=0).

By means of the control unit 81, switching off of the output drivers of the actuation control unit 83 can be tested via HW-Out, in particular even if both switching units 95 and 96 are closed. Furthermore, if at least one of the two switching units 95, 96 is closed, the activation of the output drivers can also be tested. For this the traction release test request TFTA can be activated by means of the central train control apparatus 8 and be converted into the traction release test signal value (in other words the traction release test information) TS.1. The traction release test signal value TS.1 is then converted into the traction release request signal value S1.1 of the request signal S1, under the effect of which the output of the drive control signal AAS is activated.

A particular feature of the illustrated embodiment of the inventive device is that the traction release request signal value S3.1 due to the traction release condition TFB (Wv*>Wvmin) is not generated centrally on the vehicle from a centrally measured vehicle speed, but rather locally by the respective vehicle speed detection apparatus 60 in the vicinity of the respective electric drive apparatus 40.

Should a fault occur in the speed detection, the fault has only a local effect in this embodiment. Under certain circumstances, due to a fault in the speed detection during emergency braking, it could happen that the actuation of one of the drive apparatuses 40, in other words, the action of one of the arrangements A, is blocked, while the other arrangements A of the vehicle 1 continue to operate in a fault-free manner and therefore implement the emergency braking request. The braking effect of the vehicle would then be reduced, but due to the action of the other arrangements A, in other words, due to the redundancy of the arrangements A, would continue to apply.

With the inventive device it is now possible to allow the electric drive to act on the emergency brake without it being possible to switch it off due to the opening of the safety loop 31. As a result of the redundancy of the arrangements A, in particular also of the signal generation for standstill detection, the influence of individual faults on the braking action of the vehicle 1 is minimized and therefore a greater level of safety is achieved. In addition, an undesired movement is prevented when the vehicle 1 is at a standstill.

The invention claimed is:

1. A device for controlling a vehicle drive for traction of a vehicle, the device comprising:
    a drive control apparatus;
    a monitoring apparatus connected to said drive control apparatus and configured to provide said drive control apparatus with a traction release control signal value, the traction release control signal value releasing said drive control apparatus for actuation of the vehicle drive if, in addition to a traction release request signal value due to an emergency braking request and a traction lock request signal value due to a traction lock request, an additional traction release request signal value due to a traction release condition acts on said monitoring apparatus.

2. The device according to claim 1, wherein said monitoring apparatus is configured for providing said drive control apparatus with a traction lock control signal value, instead of the traction release control signal value, wherein the traction lock control signal value locks the drive control apparatus for actuation of the vehicle drive if, in addition to the traction release request signal value due to the emergency braking request and the traction lock request signal value due to the traction lock request, an additional traction lock request signal value due to a traction lock condition acts on said monitoring apparatus instead of the additional traction release request signal value.

3. The device according to claim 1, wherein said monitoring apparatus is configured for providing the traction release request signal value as the traction release control signal value.

4. The device according to claim 1, wherein said drive control apparatus, upon receiving an emergency braking signal value, is configured for providing said monitoring apparatus with the traction release request signal value.

5. The device according to claim 4, wherein said drive control apparatus is configured for providing said monitoring apparatus with a traction lock request signal value due to a traction lock test request, instead of the traction release request signal value, if the emergency braking signal value is not present.

6. The device according to claim 1, wherein said monitoring apparatus is a hardware apparatus.

7. The device according to claim 6, wherein said monitoring apparatus is an electrical circuit.

8. The device according to claim 1, wherein: said monitoring apparatus has a control signal path, at which the traction release request signal value is present due to the emergency braking request, and a switching apparatus with two parallel-connected switching units in said control signal path; said control signal path is released for signal transmission by said switching if one of said switching units is kept open by way of the traction lock request signal value due to the traction lock request and another of said switching units is kept closed by way of the additional traction release request signal value due to the traction release condition.

9. The device according to claim 8, wherein said control signal path is locked for signal transmission by said switching apparatus if the one of said switching units is kept open by way of the traction lock request signal value due to the traction lock request and the other of said switching units is kept open by way of an additional traction lock request signal value due to a traction lock condition.

10. The device according to claim 1, wherein:
    said drive control apparatus has a control unit, an output unit forming a control output, and an actuation control unit forming a control input;
    said control unit is configured for outputting a drive control command to said actuation control unit, and said actuation control unit is configured to convert the drive control command into a drive control signal;
    said control unit is configured for outputting, by way of an emergency braking signal value, which is present at said control unit due to the emergency braking request, a request for traction release to said output unit, and said output unit is configured to convert the request for traction release into the traction release request signal value and to output the traction release request signal value at said control output; and
    said actuation control unit is configured for releasing an output of the drive control signal when said traction release control signal value is present at the control input of said actuation control unit, and to block the output of the drive control signal when a traction lock control signal value is present at the control input of said actuation control unit instead of the traction release control signal value.

11. A vehicle, comprising:
    at least one vehicle drive for traction of the vehicle; and
    the device according to claim 1 for controlling said at least one vehicle drive.

12. The vehicle according to claim 11, comprising: a hard-wired safety loop configured for providing said monitoring apparatus with the traction lock request signal value when said safety loop is interrupted due to the traction lock request, and for providing the additional traction release request signal value, instead of the traction lock request signal value, when said safety loop is closed.

13. The vehicle according to claim 11, further comprising a speed detection apparatus configured for providing the additional traction release request signal value if at least one detected speed value or a speed value of the vehicle derived from the at least one detected speed value is greater than a predefined minimum speed value, and for providing an additional traction lock request signal value due to a traction lock condition, instead of the additional traction release request signal value, if each of the detected speed values or the derived speed value of the vehicle is less than or equal to the predefined minimum speed value.

14. The vehicle according to claim 13, further comprising a sensor device, wherein said sensor device or said speed detection apparatus is configured for forming the at least one detected speed value based on measurement signals which are detected by said sensor device on a bogie provided with the vehicle drive.

15. A method for controlling a vehicle drive for traction of a vehicle, the method comprising:

providing a traction release control signal value with a monitoring apparatus of a drive control apparatus, in order to release the drive control apparatus for actuation of the vehicle drive if, in addition to a traction release request signal value due to an emergency braking request and a traction lock request signal value due to a traction lock request, an additional traction release request signal value due to a traction release condition also acts on the monitoring apparatus.

16. The method according to claim 15, which comprises: using the monitoring apparatus to provide the drive control apparatus with a traction lock control signal value, instead of the traction release control signal value, in order to lock the drive control apparatus for actuation of the vehicle drive if, in addition to the traction release request signal value due to the emergency braking request and the traction lock request signal value due to the traction lock request, an additional traction lock request signal value due to a traction locking condition acts on the monitoring apparatus instead of the additional traction release request signal value.

* * * * *